United States Patent
Inoue et al.

(10) Patent No.: US 12,247,841 B2
(45) Date of Patent: Mar. 11, 2025

(54) NAVIGATION DEVICE, VEHICLE, NAVIGATION METHOD, AND NON-TRANSITORY STORAGE MEDIUM

(71) Applicant: NIKON CORPORATION, Tokyo (JP)

(72) Inventors: Hideya Inoue, Yokohama (JP); Shoei Nakamura, Yokohama (JP); Takayuki Kasuya, Tokorozawa (JP)

(73) Assignee: NIKON CORPORATION, Tokyo (JP)

( * ) Notice: Subject to any disclaimer, the term of this patent is extended or adjusted under 35 U.S.C. 154(b) by 364 days.

(21) Appl. No.: 17/294,539

(22) PCT Filed: Dec. 19, 2018

(86) PCT No.: PCT/JP2018/046791
§ 371 (c)(1),
(2) Date: May 17, 2021

(87) PCT Pub. No.: WO2020/129182
PCT Pub. Date: Jun. 25, 2020

(65) Prior Publication Data
US 2021/0404830 A1  Dec. 30, 2021

(51) Int. Cl.
*G01C 21/36* (2006.01)
*G06V 20/59* (2022.01)
(Continued)

(52) U.S. Cl.
CPC ..... *G01C 21/3608* (2013.01); *G01C 21/3617* (2013.01); *G06V 20/59* (2022.01);
(Continued)

(58) Field of Classification Search
CPC ............ G01C 21/3608; G01C 21/3617; G06V 20/59; G06V 40/28; G06V 40/172;
(Continued)

(56) References Cited

U.S. PATENT DOCUMENTS 8,880,270 B1 * 11/2014 Ferguson ............... G06Q 50/10
705/6
10,089,980 B2  10/2018 Matsuoka et al.
(Continued)

FOREIGN PATENT DOCUMENTS

| JP | 2009-282704 A | 12/2009 |
| JP | 2016-206646 A | 12/2016 |
| WO | 2016/158792 A1 | 10/2016 |

OTHER PUBLICATIONS

Mar. 5, 2019 Search Report issued in International Patent Application No. PCT/JP2018/046791.
(Continued)

*Primary Examiner* — Tyler J Lee
*Assistant Examiner* — Kimia Kohankhaki
(74) *Attorney, Agent, or Firm* — Oliff PLC

(57) ABSTRACT

An interactive device to perform speech interaction with a speaker includes a recognition section, an input/output section, an information generation section, an identification section, and a control section. The recognition section is configured to recognize audience members around the speaker. The input/output section is configured to input and output information as speech. The information generation section is configured to generate second information in response to first information that has been input to the input/output section. The identification section is configured to identify a speaker who spoke the first information. The control section is configured to judge whether or not the second information is information favorable to the speaker identified by the identification section, and to cause the second information to be output from the input/output section in cases in which the second information is judged to be favorable.

10 Claims, 6 Drawing Sheets

(51) Int. Cl.
  *G06V 40/20*  (2022.01)
  *G10L 15/22*  (2006.01)
  *G10L 17/22*  (2013.01)

(52) U.S. Cl.
  CPC .............. *G06V 40/28* (2022.01); *G10L 15/22* (2013.01); *G10L 17/22* (2013.01); *G10L 2015/223* (2013.01)

(58) Field of Classification Search
  CPC ... G10L 15/22; G10L 17/22; G10L 2015/223; G10L 13/00
  See application file for complete search history.

(56) References Cited

U.S. PATENT DOCUMENTS

| | | | |
|---|---|---|---|
| 2009/0292528 A1 | 11/2009 | Kameyama | |
| 2012/0215641 A1* | 8/2012 | Ohki | G08G 1/096741 705/14.62 |
| 2013/0166096 A1* | 6/2013 | Jotanovic | G01C 21/3617 701/1 |
| 2014/0214424 A1* | 7/2014 | Wang | G06V 40/172 704/246 |
| 2014/0309927 A1* | 10/2014 | Ricci | G01C 21/26 701/424 |
| 2016/0212522 A1* | 7/2016 | Lee | B60W 50/14 |
| 2017/0157521 A1* | 6/2017 | Comploi | G06V 40/174 |
| 2017/0166055 A1* | 6/2017 | Maylone | G01C 21/362 |
| 2018/0107445 A1 | 4/2018 | Ohmura | |
| 2019/0207946 A1* | 7/2019 | Mertens | G06F 21/6245 |

OTHER PUBLICATIONS

Jun. 21, 2022 Office Action issued in Japanese Patent Application No. 2020-560701.
Mar. 5, 2019 Written Opinion of the International Searching Authority issued in International Patent Application No. PCT/JP2018/046791.

* cited by examiner

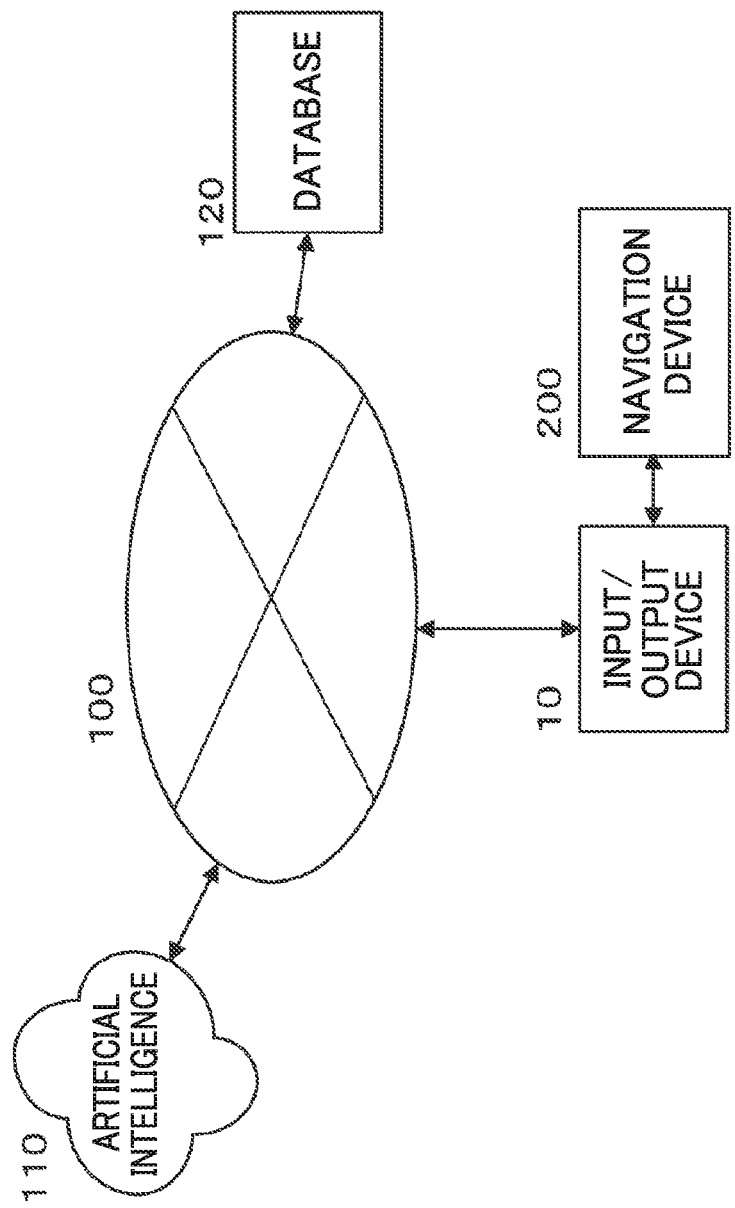

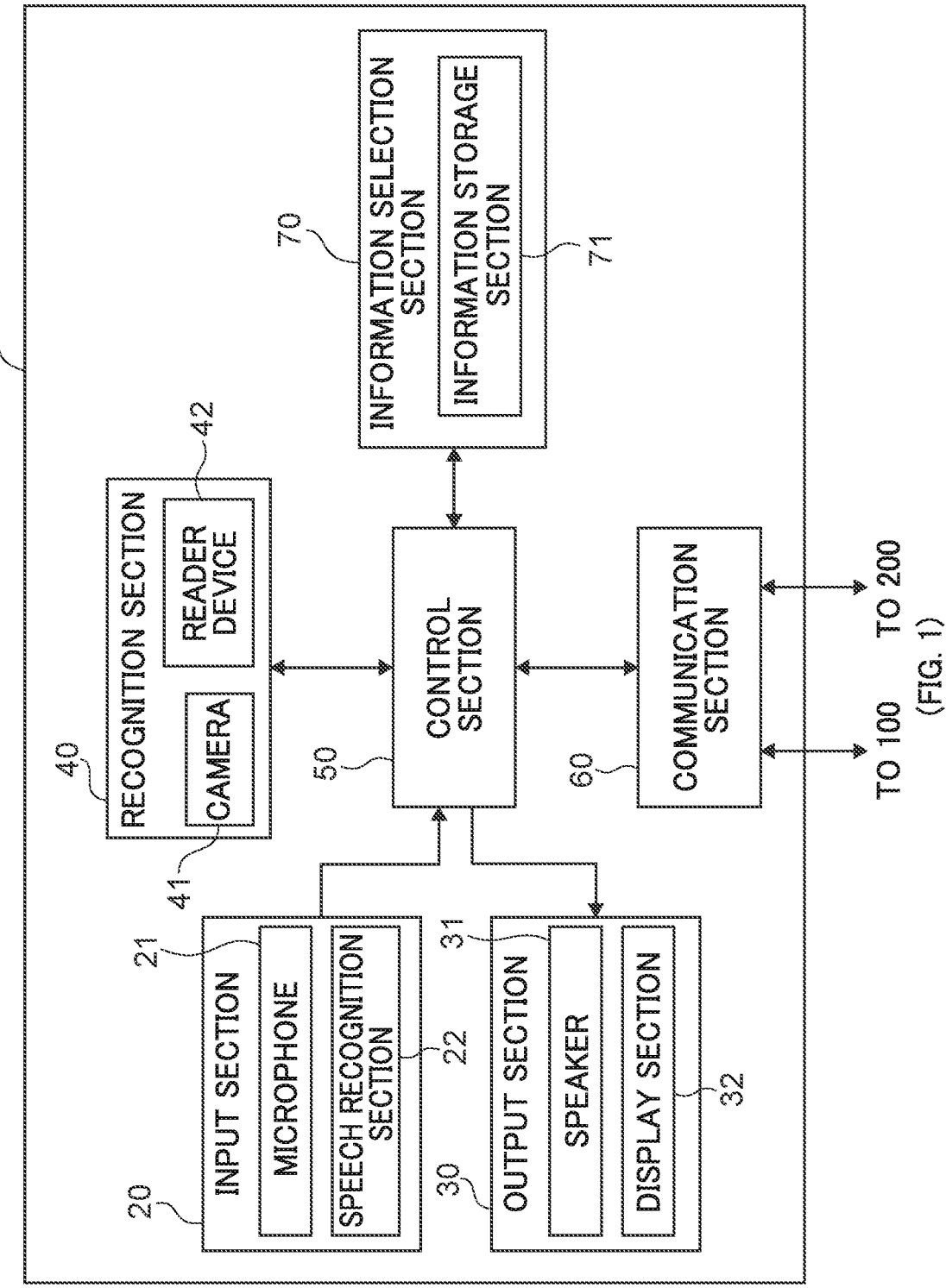

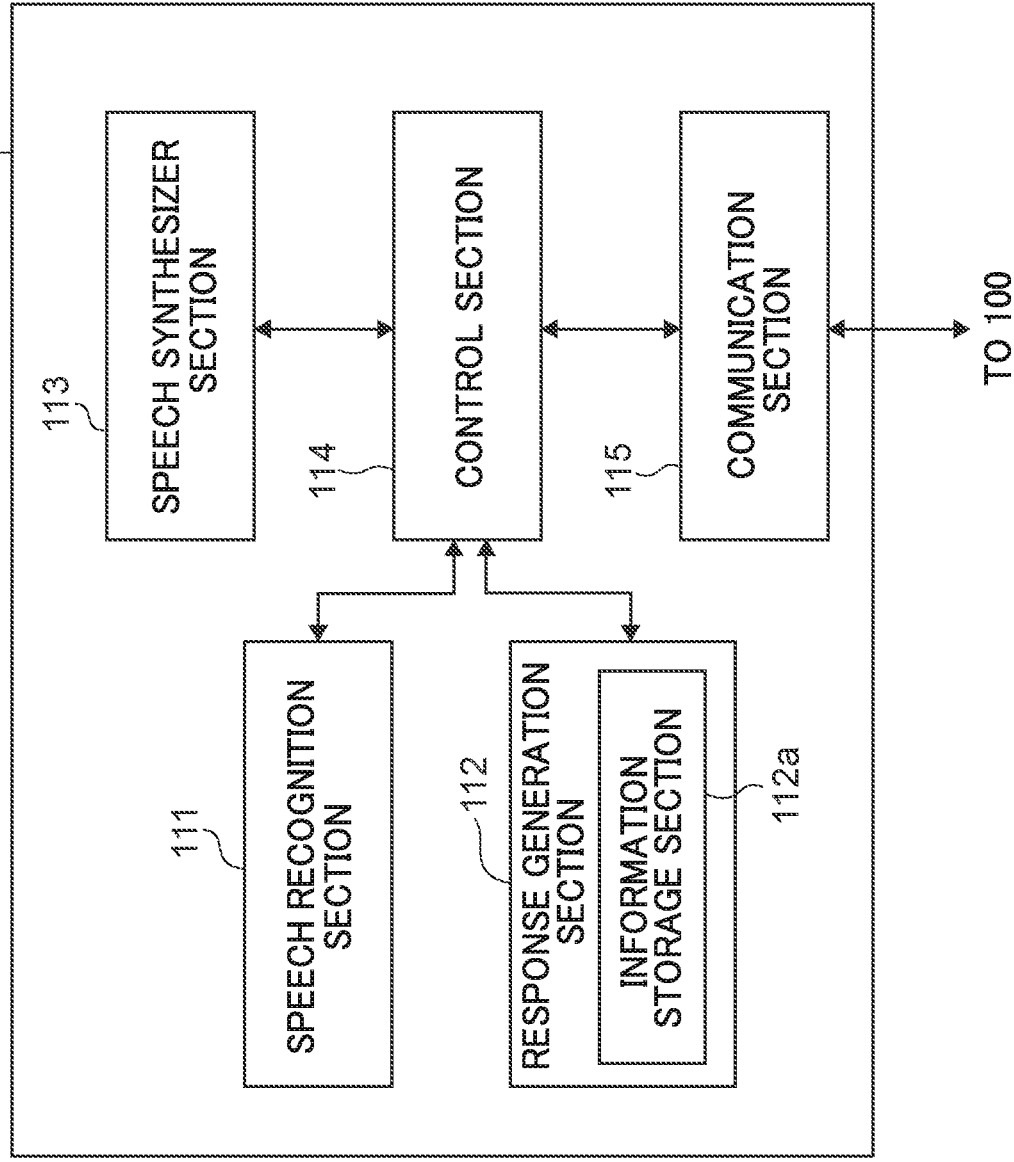

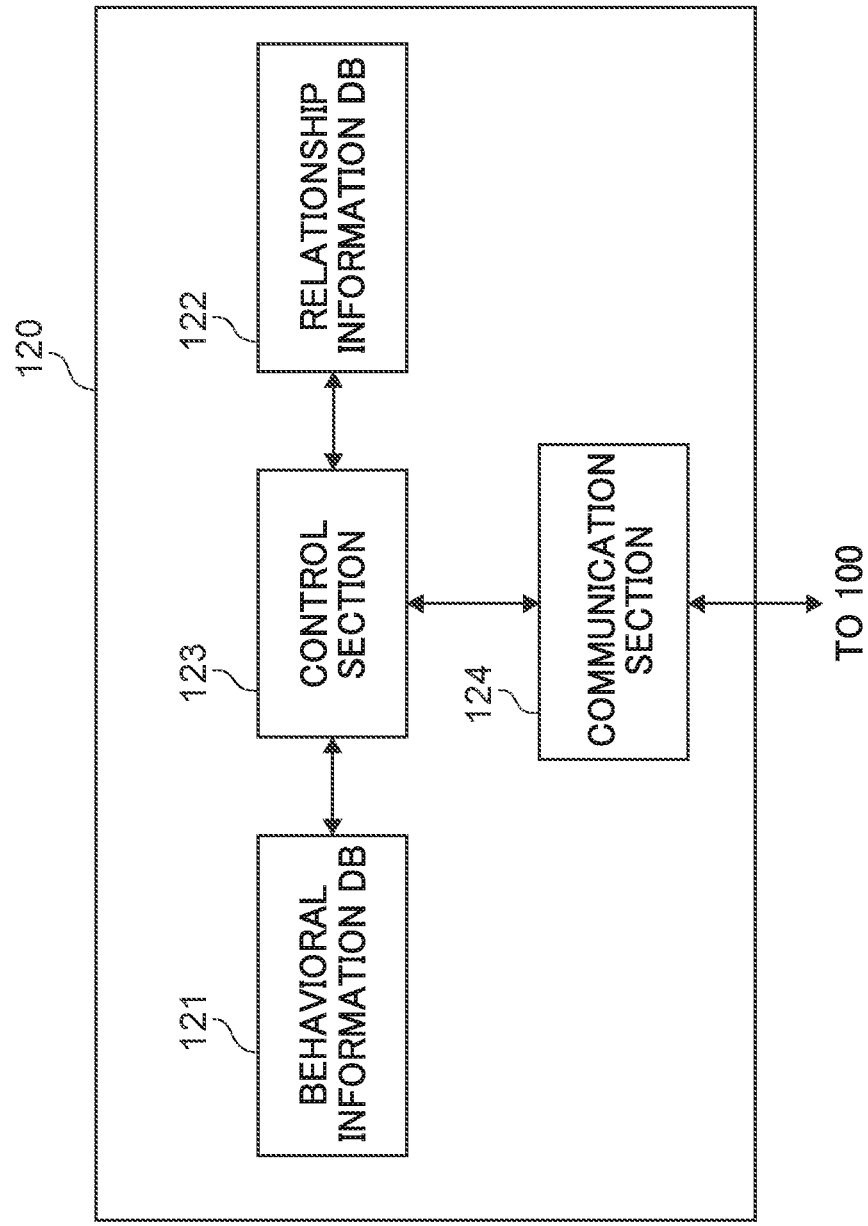

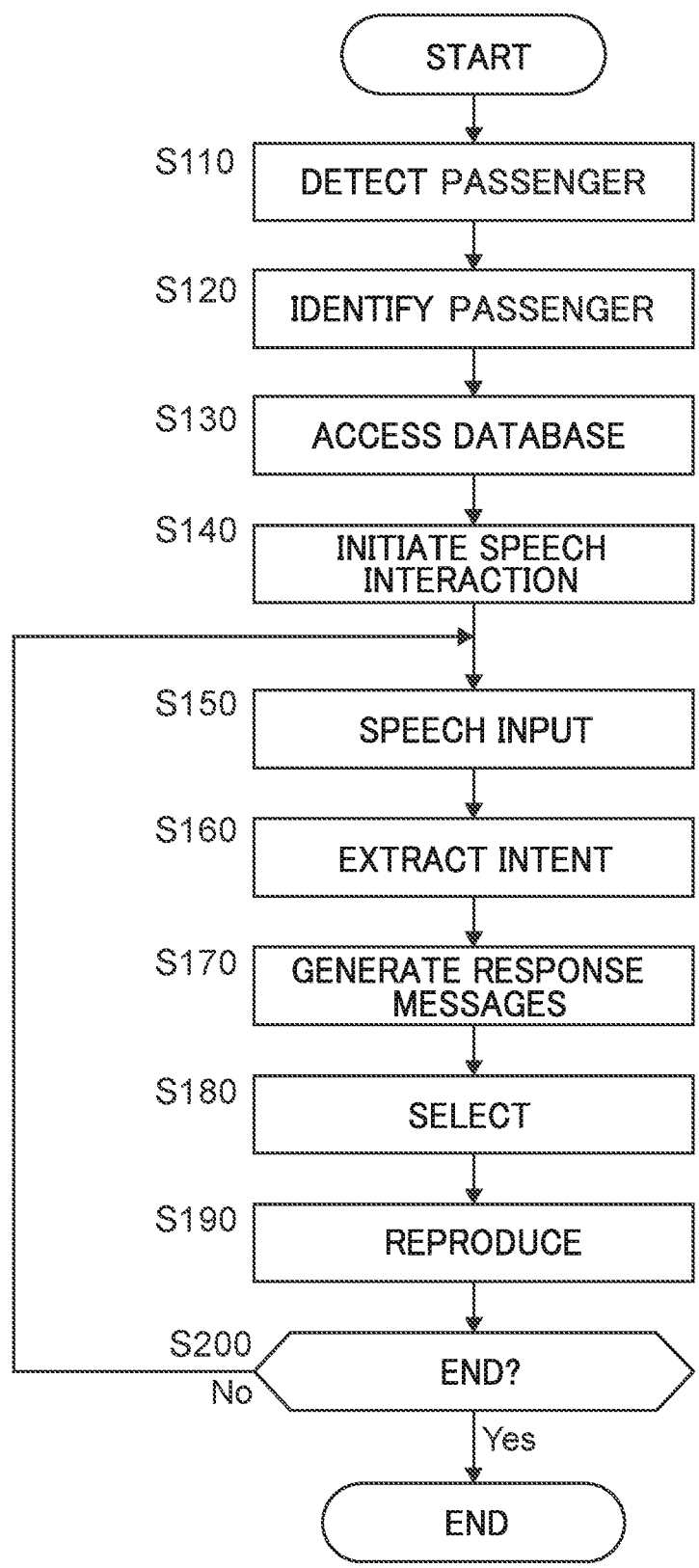

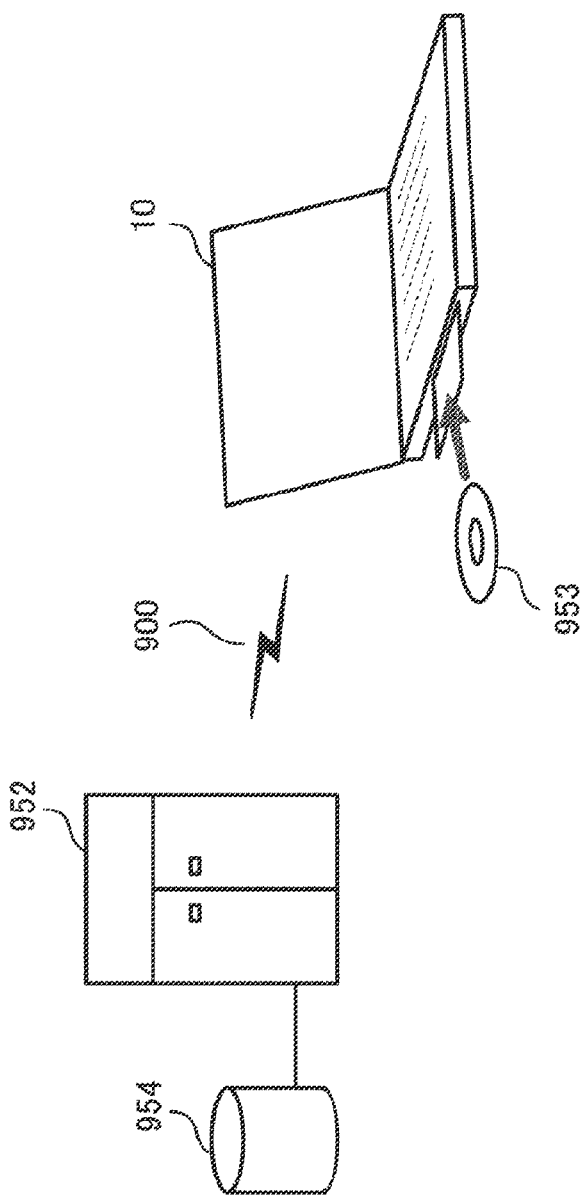

NAVIGATION DEVICE, VEHICLE, NAVIGATION METHOD, AND NON-TRANSITORY STORAGE MEDIUM

TECHNICAL FIELD

The present invention relates to an interactive device, an interactive system, and an interactive program.

BACKGROUND ART

Technology is known for reproducing audio with different directionality toward people in the surroundings of interactive devices called AI speakers (speakers provided with AI assistant functionality) (see Patent Document 1). However, there are cases in which the information reproduced is information that should not be divulged to other people.

PATENT DOCUMENT

Patent Document 1: Japanese Patent Application Laid-Open (JP-A) No. 2016-206646

SUMMARY OF INVENTION

A first aspect of the present invention is an interactive device including an interaction function to perform speech interaction with a speaker. The interactive device includes a recognition section, an input/output section, an information generation section, an identification section, and a control section. The recognition section is configured to recognize audience members around the speaker. The input/output section is configured to input and output information as speech. The information generation section is configured to generate second information in response to first information that has been input to the input/output section. The identification section is configured to identify a speaker who spoke the first information. The control section is configured to judge whether or not the second information is information favorable to the speaker identified by the identification section, and to cause the second information to be output from the input/output section in cases in which the second information is judged to be favorable.

A second aspect of the present invention is an interactive system including an interaction function to recognize a question and to output a response to the question. The interactive system includes an interaction section, a recognition section, and a control section. The interaction section includes a first response mode to output a standard first response and a second response mode to output a second response considering a surrounding environment. The recognition section is configured to recognize a gesture of a questioner. The control section is configured to control so as to switch from the first response mode to the second response mode in cases in which the gesture has been recognized.

A third aspect of the present invention is an interactive program that is a program to cause processing to be executed in a computer installed in an interactive device for performing speech interaction with a speaker. The processing includes: processing to recognize a surrounding environment; processing to input information; processing to generate second information in response to the first information that has been input; processing to identify a speaker who spoke the first information; and processing to judge whether or not the second information is information favorable in the recognized surrounding environment or to the identified speaker, and to output the second information in cases in which the second information is judged to be favorable.

BRIEF DESCRIPTION OF DRAWINGS

FIG. 1 is a diagram illustrating an example of a configuration of an interactive system according to a first embodiment.

FIG. 2 is a diagram illustrating an example of a configuration of an input/output device.

FIG. 3 is a diagram illustrating an example of a configuration of an artificial intelligence.

FIG. 4 is a diagram illustrating an example of a configuration of a database.

FIG. 5 is a flowchart to explain a flow of operation executed by an interactive system.

FIG. 6 is an explanatory diagram illustrating provision of a program.

DESCRIPTION OF EMBODIMENTS

FIG. 1 is a diagram illustrating an example of a configuration of an interactive system according to an exemplary embodiment.

In the present exemplary embodiment, explanation is given regarding an example of a situation in which a passenger or an occupant of a vehicle makes a spoken request for guidance to a navigation device 200. The interactive system is configured by an input/output device 10, an artificial intelligence 110, a database 120, and a navigation device 200. The input/output device 10, the artificial intelligence 110, and the database 120 are connected together over a network 100.

Note that the input/output device 10 and the navigation device 200 may be configured as a single unit. In cases in which a single unit configuration is adopted the integrally configured navigation device 200 is connected to the network 100.

Alternatively, instead of providing the navigation device 200, a cloud server providing a navigation service and capable of connecting to the network 100 may be provided, and a configuration adopted in which the input/output device 10 and the cloud server are connected together over the network 100.

Input/Output Device 10

The input/output device 10 takes in input of speech spoken by a speaker, and outputs speech synthesized by the interactive system. FIG. 2 is a diagram illustrating an example of a configuration of the input/output device 10. The input/output device 10 includes an input section 20, an output section 30, a recognition section 40, a control section 50, a communication section 60, and an information selection section 70.

Input Section 20

In the present exemplary embodiment the input section 20 includes a function to receive speech spoken by a passenger of a vehicle, who is the user of the input/output device 10. The input section 20 is therefore configured including a microphone 21 to convert input speech into an electrical audio signal, and a speech recognition section 22 to recognize the input speech. The speech recognition section 22 is also capable of converting (transcribing) input speech into text information.

Note that plural of the microphones 21 may be provided in the input section 20 and arranged so as to enable, for example, sound to be picked up at each seating position of passengers.

Output Section 30

The output section 30 includes a function to provide audio information and visual information to the passenger of the vehicle. The output section 30 is therefore configured including a speaker 31 and a display section 32. The speaker 31 reproduces synthesized speech as the audio information. Synthesized speech is generated by the output section 30, for example by performing processing to read out the text information described above. The output section 30 is also capable of playing back input speech from the speaker 31 as reproduced speech based on audio signals, without converting the input speech into text information.

The display section 32 is configured by a liquid crystal display device or the like, and displays text screens as visual information. Such text screens are generated based on the text information.

Recognition Section 40

The recognition section 40 includes an image recognition function to obtain information which may be employed to identify a vehicle passenger. The recognition section 40 is therefore configured including a camera 41 to capture still images or video images. The recognition section 40 recognizes the faces of people in the vehicle based on the images captured by the camera 41, and stores feature value information obtained from images of the faces of the people. The stored feature value information is then employed in passenger identification.

The recognition section 40 may further include a reader device 42 to acquire an ID of a passenger, for example information (a number or the like) from a driving license or the like. The recognition section 40 stores information acquired by the reader device 42 in association with feature value information based on facial images of passengers captured by the camera 41. An algorithm may be employed to associate information acquired by the reader device 42 with images of passengers by the camera 41. The stored information acquired by the reader device 42 and the stored feature value information associated with this information are employed in passenger identification.

Note that there is no limitation to providing a single camera 41 to the recognition section 40. For example, plural of the cameras 41 may be arranged corresponding to each seat inside the vehicle.

Control Section 50

The control section 50 is, for example, configured by a microprocessor or microcomputer, and includes a function to control operation of each configuration in the input/output device 10. The control section 50 controls input by the input section 20, controls output by the output section 30, controls recognition by the recognition section 40, controls communication by the communication section 60, controls selection by the information selection section 70, etc.

For example, based on a request from a passenger input as speech via the input section 20, the control section 50 uses the communication section 60 to causes the navigation device 200 to perform a search for a candidate destination and route guidance to the destination. Moreover, based on the passenger request input as speech via the input section 20, the control section 50 uses the communication section 60 to cause response messages to be generated by the artificial intelligence 110 according to the passenger request. The control section 50 also identifies a passenger based on recognition results of the recognition section 40, and via the communication section 60 accesses the database 120 to read and write information related to the identified passenger, namely passenger-related information. Passenger-related information acquired from the database 120 is employed by the information selection section 70, described later, to select a response message.

Communication Section 60

The communication section 60 includes a function to communicate with external devices, including the navigation device 200, the artificial intelligence 110, and the database 120. Based on instructions from the control section 50, the communication section 60 transmits to the navigation device 200 instructions to search for a destination or instructions to give route guidance to a destination. Moreover, based on instructions from the control section 50, the communication section 60 also exchanges audio signals and text information with the artificial intelligence 110. Furthermore, based on instructions from the control section 50, the communication section 60 transmits and receives data to and from the database 120. The communication section 60 and the network 100 may be connected together by either wired or wireless connection.

The communication section 60 is also capable of performing short range wireless communication with a smartphone (not illustrated in the drawings) carried by a passenger using Bluetooth (registered trademark) or the like.

Information Selection Section 70

The information selection section 70 includes a function to select information to be provided to the passenger of the vehicle from the output section 30. For example, in cases in which plural destinations have been obtained by the navigation device 200, the information selection section 70 selects a destination for provision to the passenger. For example, the information selection section 70 may select a destination close to the current location from a logical perspective.

The information selection section 70 also selects a response message to provide to the passenger in cases in which plural response messages have been generated by the artificial intelligence 110. For example, the information selection section 70 selects a response message to provide to the passenger by judging whether the content of a response message is information suitable to be divulged to all passengers in the vehicle, or is information that should not be divulged to all passengers. Judgement rules used in the judgement as to whether or not a response message may be divulged to all passengers are held in an information storage section 71 of the information selection section 70. Such judgement rules will be described later.

In this manner, the information selection section 70 also functions as a judgement section to judge whether or not to provide a response message generated by the artificial intelligence 110 inside the vehicle.

Note that the input/output device 10 may be any electronic apparatus provided with the microphone 21, the speaker 31, the camera 41, the communication section 60, and so on. Examples thereof include a smartphone and an artificial intelligence (AI) speaker.

Artificial Intelligence

FIG. 3 is a diagram illustrating an example of a configuration of the artificial intelligence 110. The artificial intelligence 110 includes a speech recognition section 111, a response generation section 112, a speech synthesizer section 113, a control section 114, and a communication section 115.

Speech Recognition Section 111

The speech recognition section 111 includes a function that is input with an audio signal received from the input/output device 10 via the communication section 115, and that recognizes speech input. The speech recognition section 111 also converts (transcribes) speech input into text information. Note that transcription processing by the speech recognition section 111 may be omitted in cases in which text information has been received from the input/output device 10 via the communication section 115.

Response Generation Section 112

The response generation section 112 includes a function to extract a spoken intent of a passenger based on text information. For example, a spoken intent of "Search for an Italian restaurant" is attributed to phrases such as "I want to go to an Italian restaurant", "Take me to an Italian restaurant", and "Italian food would be nice".

The response generation section 112 also attributes a spoken intent of "Search for an Italian restaurant" to phrases such as "I want to eat pasta", "A Margherita would be nice", or "I want to eat carpaccio". Relationships between text information and spoken intent may, for example, be built based on a machine learning technique such as a neural network or regression modelling, or based on a statistical technique.

The response generation section 112 also includes a function to generate a response to the extracted spoken intent. For example, the response generation section 112 generates a response message of "Searching for an Italian restaurant" in response to the spoken intent of "Search for an Italian restaurant". The response generation section 112 includes an information storage section 112a stored with plural spoken intents stored in association with corresponding response messages. The response messages may, for example, be generated as transcribed response text information.

Speech Synthesizer Section 113

The speech synthesizer section 113 includes a function to generate synthesized speech, for example by processing to read out the response text information. The synthesized speech is transmitted to the input/output device 10 via the communication section 115.

Note that the processing by the speech synthesizer section 113 to generate synthesized speech may be omitted in cases in which text information transmitted from the input/output device 10 is received by the communication section 115. Accordingly, the response text information generated by the response generation section 112 is transmitted to the input/output device 10 via the communication section 115.

Control Section 114

The control section 114 is, for example, configured by a computer device or the like, and includes a function to control operation of the each configuration in the artificial intelligence 110. Moreover, the control section 114 according to the present exemplary embodiment also includes a coordination function for inter-configuration coordination of the results of processing by each of the configurations.

Communication Section 115

The communication section 115 includes a function to communicate with external devices, including the input/output device 10. For example, the communication section 115 according to the present exemplary embodiment implements speech interaction by exchanging audio signals with the input/output device 10, and to transmit text information to and receive text information from the input/output device 10.

The functional configuration of the artificial intelligence 110 according to the present exemplary embodiment described above with reference to FIG. 3 is merely one example thereof, and there is no limitation to the example illustrated in FIG. 3. Each of the functions of the artificial intelligence 110 may be build based on a machine learning technique or a statistical technique as described above. Moreover, each of the configurations described is not necessarily configured so as to be clearly separate, and may be flexibly built according to such factors as the selection algorithm and device capabilities. For example, the artificial intelligence 110 may extract spoken intent and generate response messages based on control signals from the input/output device 10. Alternatively, some of the functions of the artificial intelligence 110 may be shared with the input/output device 10.

Database

FIG. 4 is a diagram illustrating an example of a configuration of the database 120. The database 120 includes a behavioral information DB 121, a relationship information DB 122, a control section 123, and a communication section 124.

Behavioral Information DB 121

The behavioral information DB 121 is a database stored with information relating to behavior of users of the input/output device 10. For example, the behavioral information DB 121 according to the present exemplary embodiment is stored with basic information such as user ID, name, date of birth, occupation, gender, place of birth, personality, and interests, as well as a behavior history of the respective user. The behavior history includes a commuting history (to place of work or study), and a usage history relating to eateries, shops, gyms, hairdressers/barbers, hospitals, schools (including seminar and cram school institutions), and the like.

Relationship Information DB 122

The relationship information DB 122 is a database to store information relating to personal relationships of users. For example, basic information about users such as ID, name, date of birth, occupation, gender, place of birth, personality, and interests is stored in the relationship information DB 122 according to the present exemplary embodiment, together with information relating to the user's family, romantic partners, friends, professional acquaintances, leisure acquaintances, and the like.

Control Section 123

The control section 123 is, for example, configured by a microprocessor or microcomputer, and includes a function to control the respective configurations of the database 120. The control section 123 according to the present exemplary embodiment is, for example, capable of searching for and acquiring information stored in the behavioral information DB 121 and the relationship information DB 122, based on a request signal from the input/output device 10.

Communication Section 124

The communication section 124 includes a function to communicate with external devices, including the input/output device 10 and the artificial intelligence 110. For example, the communication section 124 receives basic information such as a user ID from the input/output device 10, references the behavioral information DB 121 and the relationship information DB 122 based on this information, and transmits information relating to the user to the input/output device 10.

Interaction Example

In the present exemplary embodiment, let us assume a user of the input/output device 10 has the name "Taro (male name)". Let us also assume that Taro is traveling in a vehicle installed with the input/output device 10 together with his partner Hanako (female name). The interactive system accordingly interacts with Taro and Hanako.

On receipt of information indicating the passengers of the vehicle as identified by the input/output device 10, the response generation section 112 of the artificial intelligence 110 responds by generating a response message such as "Hi there Taro and Hanako. It's 12.15 pm on (day, date)". The response generation section 112 then follows on by generating a response message of "Is there anything I can help you with?" These response messages are transmitted from the artificial intelligence 110 to the input/output device 10, and reproduced by the output section 30 so as to be conveyed to Taro and Hanako.

Note that the interactive system may initiate an interaction based on speech by Taro or Hanako (for example "OK, . . ." or "Hey, . . .").

The input/output device 10 transmits text information to the artificial intelligence 110 based on speech spoken by Taro and Hanako, such as "I want to eat pasta" or "A Margherita would be nice". Based on the text information transmitted from the input/output device 10, the response generation section 112 of the artificial intelligence 110 extracts the spoken intent of "Search for an Italian restaurant", and generates a response message to this spoken intent of "Searching for an Italian restaurant". This response message (response text information) is transmitted from the artificial intelligence 110 to the input/output device 10 together with the spoken intent. The response message is reproduced by the output section 30 so as to be conveyed to Taro and Hanako.

Based on the spoken intent received from the artificial intelligence 110, the input/output device 10 causes the navigation device 200 to search for Italian restaurants located within a distance corresponding to a 30 minute travel time. Search results found by the navigation device 200 are then transmitted to the artificial intelligence 110 via the input/output device 10.

Based on the search results of the navigation device 200, the artificial intelligence 110 may then acquire various information regarding restaurant X, restaurant Y, and restaurant Z, from a non-illustrated portal site that provides information relating to eateries, for example.

Based on the information relating to the user acquired from the database 120, the eatery information acquired from the portal site, and the like, the response generation section 112 of the artificial intelligence 110 generates plural response message candidates to convey information regarding restaurant X, restaurant Y, and restaurant Z.

Candidate 1: "Restaurant X offers lunchtime deals. I took you there about a month ago, Taro and Hanako."
Candidate 2: "Restaurant X offers lunchtime deals. I took Taro there with Jill and Joe about two months ago."
Candidate 3: "The pasta dishes at Restaurant Y are highly rated. I took Taro there about two months ago"
Candidate 4: "The pasta dishes at Restaurant Y are highly rated. I took Taro there with Q from XX company about two weeks ago."
Candidate 5: "The pasta dishes at Restaurant Y are highly rated. I took Taro there with D about six months ago."
Candidate 6: "The carpaccio dishes and wine at Restaurant Z are highly rated. But the driver mustn't drink."

These candidates for a response message are then sent from the artificial intelligence 110 to the input/output device 10 as response text information. The response message candidates are not reproduced by the output section 30 at this point, so none of these response message candidates is conveyed to Taro and Hanako at this point.

Based on the judgement rules, described in detail later, the information selection section 70 of the input/output device 10 selects Candidate 1 ("Restaurant X offers lunchtime deals. I took you there about a month ago, Taro and Hanako.") from out of the response text information transmitted from the artificial intelligence 110. This selection result is then transmitted to the artificial intelligence 110 via the input/output device 10. The response text information of the selected Candidate 1 is also reproduced by the output section 30. The response message of Candidate 1 is thus conveyed to both Taro and Hanako.

Note that in this example, the artificial intelligence 110 may, for example, select the response message as described above based on rules such as the following. Namely, a rule that the artificial intelligence 110 should not select information that may negatively affect the personal relationship between Taro and Hanako based on the information in the database 120, or a rule that the artificial intelligence 110 should not select information unfavorable to Taro. In the present example, from the information in the database 120 it is ascertained that Hanako is Taro's "current girlfriend", and Jill is Taro's "ex-girlfriend". The response message is accordingly selected after judging that making the "current girlfriend" aware that Taro had dinner with the "ex-girlfriend" would negatively affect their personal relationship, namely judging that this might cause their romantic relationship to come to an end, and accordingly may be unfavorable to Taro.

Namely, in this example, response messages that are favorable to both Taro and Hanako are Candidate 1 and Candidate 3 (were Taro and Hanako not to select Candidate 1, then Candidate 3 would be recommended next), while response messages that are unfavorable are Candidate 2 and Candidate 6. Candidate 4 and Candidate 5 may be selected as favorable response messages if persons Q and D who were also present are male (or suppose females were also present but in a group rather than a one-on-one context). Attribute data (gender or the like) regarding persons Q and D may be surmised from transmission histories and transmission contents of emails (including messenger applications) on Taro's smartphone (discussions including names, appointments, dates and times, restaurants, and the like).

Note that parameters for response message candidate selection may take into consideration the past behavior history of Taro and Hanako (namely of the speaker or of the person accompanying the speaker). For example, in the case of previously visited restaurants, it might be favorable to prioritize candidates starting with those having a high overall evaluation for evaluation criteria such as "food/taste", "atmosphere", "customer service", and "value for money". This evaluation process may take into consideration behavior history as recorded in Taro or Hanako's smartphones (for example a daily log including a conversation history and the like), or restaurant reviews on a website posted by Taro or Hanako.

The input/output device 10 transmits text information to the artificial intelligence 110 based on speech spoken by Taro or Hanako, such as "Restaurant X sounds good". The response generation section 112 of the artificial intelligence 110 extracts a spoken intent of "Guide me to restaurant X" based on the text information transmitted from the input/output device 10, and generates a response message of "Taking you to restaurant X. We'll be there in about 30 minutes" in response to this spoken intent. This response message (response text information) is transmitted from the artificial intelligence 110 to the input/output device 10 together with the spoken intent. The response message is reproduced by the output section 30 so as to be conveyed to both Taro and Hanako. Based on the spoken intent received from the artificial intelligence 110, the input/output device 10 causes the navigation device 200 to initiate route guidance to restaurant X.

The response generation section 112 of the artificial intelligence 110 again generates the response message "Is there anything I can help you with?". This response message is transmitted from the artificial intelligence 110 to the input/output device 10, and is reproduced by the output section 30 so as to be conveyed to Taro and Hanako. Interactions may be subsequently repeated in a similar manner.

Note that based on the spoken intent, the artificial intelligence 110 may itself search for Italian restaurants in the vicinity of the vehicle for transmission to the input/output device 10. In such cases, the artificial intelligence 110 acquires information such as addresses, price ranges, and menus found on Italian restaurants by acquisition from a portal site providing information relating to eateries, and transmits this information to the input/output device 10.

Interaction Operation Flow

FIG. 5 is a flowchart to explain a flow of operation executed by the interactive system in the above example of an interaction. For example, the control section 50 of the input/output device 10 initiates the processing illustrated in FIG. 5 when an operation to switch ON the system in a vehicle is performed.

In the present exemplary embodiment, explanation is given regarding a flow of interaction actions as a flow of processing performed by the control section 50 of the input/output device 10. However, a configuration may be adopted in which this processing is shared with a control section of another device other than the input/output device 10.

At step S110 in FIG. 5, the control section 50 detects passengers of the vehicle based on input of information in the following ways.

1. Feature value information obtained from facial images of people in the vehicle as captured by the camera 41 of the recognition section 40 being input from the recognition section 40 to the control section 50.
2. Information acquired by the reader device 42 of the recognition section 40 being input from the recognition section 40 to the control section 50.

Note that voiceprint information obtain from speech of a passenger input to the microphone 21 of the input section 20 may be input to the control section 50 from the input section 20.

At step S120, the control section 50 identifies the vehicle passengers in the following manner. The control section 50 identifies the passengers using the feature value information from facial images, using the feature value information together with information acquired by the reader device 42, using voiceprint information from speech, using the voiceprint information together with information acquired by the reader device 42, or using the feature value information together with the voiceprint information.

Note that although images and speech are employed to identify the passengers, the following identifiers may also be employed. In cases in which the vehicle is owned by Taro, Taro may have pre-registered identifiers in the vehicle for identifying Taro himself and Hanako. Then on boarding the vehicle, the vehicle may identify Taro and Hanako as the passengers by executing determination processing for passenger identification based on these identifiers. In cases in which an ID of a mobile telephone is employed as an identifier, this identifier may be transmitted to the vehicle using short range wireless communication of the mobile telephone so as to enable the vehicle to perform a passenger check. The ID of driving license or the like may also be employed therefor.

At step S130, the control section 50 accesses the database 120 over the network 100 to update the information in the database 120 in the following manner. On identifying the passengers as being Taro and Hanako, the control section 50 updates the information regarding Taro and Hanako held in the database 120. Information regarding Taro's behavior is held in the behavioral information DB 121 of the database 120. Information regarding personal relationships of Taro is held in the relationship information DB 122 of the database 120. Information regarding Hanako's behavior is held in the behavioral information DB 121 of the database 120. Information regarding personal relationships of Hanako is held in the relationship information DB 122 of the database 120.

Out of the information held in the database 120, information regarding Taro's behavior and information regarding Taro's personal relationships may, for example, both be generated based on information held on Taro's smartphone. The control section 50 extracts required information from information registered on the smartphone by Taro, the contents of postings to social networking services (SNS) and contents of emails sent by Taro from his smartphone, incoming and outgoing call history, application usage history, and the like.

At the point in time Taro has been identified, the control section 50 connects wirelessly with Taro's smartphone using short range wireless communication as described above. The control section 50 then extracts from Taro's smartphone information that should be stored in the behavioral information DB 121 and the relationship information DB 122 of the database 120. The information extracted from the smartphone by the control section 50 is then transmitted from the input/output device 10 to the database 120 over the network 100 and stored in the behavioral information DB 121 or the relationship information DB 122. Note that the information extracted from the smartphone by the control section 50 may be merely information that has accumulated in the smartphone since the previous extraction timing, i.e. just what is referred to as differential information.

Useful information regarding Taro's behavior held in the behavioral information DB 121 may include, for example, a usage history for the smartphone of a route guidance application, an electronic payment history for the smartphone, and location information by GPS for the smartphone, as well as route guidance history of the navigation device 200. This is performed to facilitate clarification of where Taro has been, and when.

Useful information regarding personal relationships of Taro that held in the relationship information DB 122 may include, for example, a communication history of Taro and the smartphone. This approach is adopted because the frequency of speaking and data exchange with a given communication counterparty is known from the communication history. Generally, the higher the frequency of exchange, the higher the level of intimacy with the communication counterparty or exchange counterparty.

Similarly, from out of the information held in the database 120, information regarding Hanako's behavior and information regarding personal relationships of Hanako may both be generated based on information held on Hanako's smartphone. The control section 50 extracts required information from information registered on the smartphone by Hanako, the contents of postings to SNS and contents of emails sent by Hanako from her smartphone, incoming and outgoing call history, application usage history, and the like.

The extraction of information from the smartphones by the control section 50, the transmission of information from the control section 50 to the database 120, and the holding of information in the behavioral information DB 121 or the relationship information DB 122 may be handled similarly to with Taro.

At step S140, the control section 50 initiates an interaction with the passengers through the input/output device 10. When information indicating an identified passenger has been transmitted from the input/output device 10 to the artificial intelligence 110 over the network 100 by the control section 50, the artificial intelligence 110 determines this as speech interaction with the identified passenger having started. The artificial intelligence 110 then generates the response message "Is there anything I can help you with?" as a message to the identified passenger, and transmits this as response text information. The response message is reproduced by the output section 30 based on the response text information so as to be conveyed to the passenger.

At step S150, the control section 50 is input with speech spoken by the passenger by the input section 20. In cases in which speech spoken by the passenger has been converted into text information by the input section 20, the control section 50 also transmits this text information to the artificial intelligence 110 over the network 100.

Note that in cases in which speech spoken by the passenger has not been converted into text information by the input section 20, the control section 50 transmits the speech spoken by the passenger to the artificial intelligence 110 over the network 100 as an unconverted audio signal. As described above, on receipt of an audio signal the artificial intelligence 110 performs speech recognition using the speech recognition section 111 and converts the received audio signal into text information. In cases in which the speech recognition ability of the speech recognition section 111 of the artificial intelligence 110 has a higher level of recognition precision than the speech recognition ability of the speech recognition section 22 of the input/output device 10, correct speech recognition may be performed by the artificial intelligence 110 even in cases in which speech recognition was not able to be performed by the input/output device 10.

At step S160, the control section 50 stands by for receipt of a spoken intent as extracted by the artificial intelligence 110. As described above, the response generation section 112 of the artificial intelligence 110 extracts the spoken intent of the passenger based on the text information received from the input/output device 10, and transmits the spoken intent from the communication section 150 to the input/output device 10. On receipt of the spoken intent, processing transitions to step S170.

At step S170, the control section 50 stands by for receipt of response messages generated by the artificial intelligence 110. The artificial intelligence 110 generates plural response messages to the spoken intent of the passenger. The plural response messages are plural candidates for a response message and one of these is selected, as described later. The response message candidates generated by the artificial intelligence 110 are transmitted to the input/output device 10 over the network 100 as plural items of response text information. Processing to generate the response messages to the spoken intent will be described in detail later.

At step S180, the control section 50 uses the information selection section 70 to select one item of response text information from the plural items of response text information transmitted from the artificial intelligence 110. This item of response text information becomes the response message to be provided to the passenger. Details regarding judgement rules for selection will be described later.

Note that even in cases in which only one item of response text information is transmitted from the artificial intelligence 110, determination is still performed as to whether or not this response text information is selectable under the judgement rules. The information selection section 70 may employ this response text information as the response message to be provided to the passenger when selectable. However, in cases in which the response text information is non-selectable, a response message such as "Not found. Please try again" is selected.

At step S190, the control section 50 takes the response message based on the response text information selected by the information selection section 70 and reproduces the response message through the output section 30.

At step S200, the control section 50 determines whether or not speech interaction has ended. For example, in cases in which an operation to switch OFF a vehicle system has been performed, the control section 50 ends the speech interaction with the passenger. The control section 50 transmits the fact that speech interaction has ended to the artificial intelligence 110 over the network 100.

On the other hand, in cases in which an operation to switch OFF the vehicle system has not been performed, processing returns to step S150, and the above processing is repeated.

More detailed explanation follows regarding the response messages generated by the artificial intelligence 110.

On receipt of information from the input/output device 10 indicating the identified passenger, the artificial intelligence 110 generates a response message as response text information. The response generation section 112 includes the information storage section 112*a* that holds generation rules for response messages and patterns of response messages for spoken intents. The response generation section 112 is thus capable of generating response text information for a wide variety of circumstances.

As described above, the response message that is the first message after speech interaction initiation at step S140 is a response message such as "Hi there Taro and Hanako. It's 12.15 pm on (day, date)". The response message generated next is "Is there anything I can help you with?".

The response messages generated at step S170 are response messages to the spoken intent of the passenger. Specifically, the response generation section 112 generates response messages with reference to the information stored in the database 120, information acquired from a portal site, and response message patterns for the spoken intent. For example, plural response messages including the passenger's name and other words and actions are generated with reference to the information relating to the behavior of the passengers and the information relating to personal relationships of the passengers. This is performed by including information acquired from the database 120 or information acquired from a portal site as part of a response message pattern, replacing part of a response message pattern with information acquired from the database 120 or information acquired from a portal site, or the like.

Information such as, for example, the day's weather and news, various general knowledge tidbits, etc. may also be held in the information storage section 112*a* of the response generation section 112. Information such as the day's weather and news may be acquired from an external device such as another portal site over the network 100. The response generation section 112 may generate a response message with reference to information about the day's weather or news and with reference to a response message pattern for the spoken intent.

The response message patterns held in the information storage section 112a may be a fixed default set of response message patterns, or a configuration may be adopted such that the default set can be added to and modified by subsequent machine learning.

As described above, the response generation section 112 generates plural response messages (items of response text information). The purpose of generating plural response messages is to enable selection of a response message favorable to Taro.

More detailed explanation follows regarding the judgement rules for selection of the response text information by the information selection section 70.

Based on the judgement rules held in the information storage section 71, the information selection section 70 selects as the response message to provide to the passenger a single item of response text information from out of the plural items of response text information transmitted from the artificial intelligence 110. Explanation follows regarding examples of such judgement rules.

Rule 1

In cases in which there is a possibility that contents of the interaction between the input/output device 10 and the speaker from out of the passengers may be overheard by a passenger other than the speaker, the information selection section 70 selects response text information favorable to the speaker. Various such scenarios are described below.

Example 1: Passengers are Taro and Taro's Romantic Partner A

In a case in which Taro and his romantic partner A are traveling in the vehicle and the response text information transmitted from the artificial intelligence 110 includes content relating to a person B (third party) other than Taro and romantic partner A, the information selection section 70 selects response text information relating to Taro and his romantic partner A from the response text information transmitted from the artificial intelligence 110. In other words, the information selection section 70 excludes any response text information relating to the person B from the response text information transmitted from the artificial intelligence 110. Content relating to a third party refers to the name or words and actions of the third party included in the response text information.

The reason for selecting response text information in this manner is that, for example, were a restaurant where Taro has previously gone out with a female person B to be set as a destination, there would be a concern that the mood of the romantic partner A might be adversely affected by the name of the person B coming up in the interaction content between Taro (the speaker) and the input/output device 10, and so such a situation should be avoided.

The information selection section 70 also applies ranks from a logical perspective to the selected response text information, and selects the response text information with the highest rank. For example, destinations closer to the current location are more logical as destinations than destinations further from the current location from, the perspectives of suppressing travel time and saving fuel costs. Accordingly, the information selection section 70 ranks the response text information to give a higher rank for guidance to a destination closer to the current location, and selects more highly ranked response text information.

Example 2: Passengers are Taro and Taro's Family

In a case in which Taro and Taro's (entire) family are traveling in the vehicle and the response text information transmitted from the artificial intelligence 110 includes content relating to some family members C of Taro's family, the information selection section 70 selects response text information relating to Taro and Taro's (entire) family from the response text information transmitted from the artificial intelligence 110. In other words, the information selection section 70 excludes any response text information relating to just to some family members C of Taro's family from the response text information transmitted from the artificial intelligence 110.

The reason for selecting response text information in this manner is that, for example, were a restaurant where Taro had previously visited with some family members C, to be set as a destination, there would be a concern that the mood of another family member D who was not present on the previous occasion might be adversely affected by this subject coming up in the content of the interaction between Taro (the speaker) and the input/output device 10, and so such a situation should be avoided.

Example 3: Passengers are Taro and Some Family Members C of Taro's Family

In a case in which Taro and some of Taro's family members C are traveling in the vehicle and the response text information transmitted from the artificial intelligence 110 includes content relating to the family member D (third party) of Taro's family not traveling in the vehicle, the information selection section 70 selects response text information relating to Taro and the some family members C from the response text information transmitted from the artificial intelligence 110. In other words, the information selection section 70 excludes from the response text information transmitted from the artificial intelligence 110 any response text information relating to the family member D.

The reason for selecting response text information in this manner is that, for example, were a restaurant where Taro had previously visited with the family member D to be set as a destination, there would be a concern that the mood of the family members C who were not present on the previous occasion might be adversely affected by the subject of family member D coming up in the content of the interaction between Taro (the speaker) and the input/output device 10, and so such a situation should be avoided.

Example 4: Passengers are Taro and Person P1 from Company Q1 and Person P2 from Company Q2, Who are Taro's Acquaintances Through Work In a case in which Taro, person P1, and person P2 are traveling in the vehicle and the response text information transmitted from the artificial intelligence 110 includes content relating to a person P3 (third party) from company Q3 who is an acquaintance of Taro through work, the information selection section 70 selects response text information relating to Taro and the person P1 and the person P2 from the response text information transmitted from the artificial intelligence 110. In other words, the information selection section 70 excludes from the response text information transmitted from the artificial intelligence 110 any response text information relating to the person P3 who is not traveling in the vehicle.

The reason for selecting response text information in this manner is that, for example, were the name of person P3 from company Q3, this being a rival of company Q1, to come up in the content of the interaction between Taro (the speaker) and the input/output device 10, then a concern would arise that this might breach a confidentiality agreement between Taro and the company Q3, and so such a situation should be avoided Note that in Example 2 to Example 4, the information selection section 70 applies a rank to the selected response text information from a logical perspective, and selects the response text information with the highest rank, similarly to as in Example 1.

Rule 2

The information selection section 70 selects response text information based on a logical perspective alone in cases in which there is no possibility that contents of the interaction between the speaker of the passengers and the input/output device 10 may be overheard by a passenger other than the speaker. The following is an example of such an envisaged scenario.

Example 5: Taro is the Only Passenger and there are No Fellow Travelers with Taro In a case in which Taro is present in the vehicle alone and there are no passengers other than Taro, the information selection section 70 applies a rank from a logical perspective to all response text information transmitted from the artificial intelligence 110 and selects the response text information with the highest rank. This approach is adopted because there is no need to consider whether or not the mood of fellow travelers would be upset when there are no fellow travelers.

Program

A program to cause the control section 50 of the input/output device 10 to execute the processing illustrated in FIG. 5 may be recorded on a computer-readable recording medium, and the program recorded on this computer-readable recording medium delivered to the input/output device 10. The "computer-readable recording medium" refers to a storage device such as a portable recording medium such as a flexible disk, a magnetooptical disk, an optical disk, or a memory card, or to a hard disk inbuilt into a computer system. A "computer system" refers to an operating system (OS) and peripheral hardware equipment.

Alternatively, in cases in which a program is transmitted over a network such as the internet or via a communication line such as a telephone line, the "computer-readable recording medium" may be a medium that holds the program dynamically for a short period of time, and in such cases includes a medium that holds the program for a given period of time, such as volatile memory within a computer system acting as a server or client. Alternatively, the program may be a program to implement some of the functionality described above, and may also be a program to implement the functionality described above in combination with a program already recorded in a computer system.

FIG. 6 is an explanatory diagram illustrating provision of a program to the input/output device 10. The input/output device 10 may receive provision of the program via a CD-ROM 953. The input/output device 10 may receive provision of the program through a communication line 900.

A computer 952 is a server computer for providing this program, and the program is stored on a recording medium 954 such as a hard disk. The communication line 900 may be a communication line of the internet or of personal computer communication, or may be a dedicated communication line. The computer 952 reads the program from the recording medium 954 and transmits the program to the input/output device 10 over the communication line 900. Namely, the program is transmitted through the communication line 900 as a data signal carried by carrier waves. In this manner, the program may be provided as a computer-readable computer program product in various formats, such as by a recording medium or by a carrier wave.

The present exemplary embodiment configured as described above obtains the following operation and advantageous effects.

(1) An interactive device including an interaction function is configured to perform speech interaction with people. The interactive device includes a recognition section 40 to recognize surrounding people; an input section 20 and an output section 30 to input and output information as speech; a control section 50 to acquire from an artificial intelligence 110 a response message to respond to a spoken intent input to the input section 20; the recognition section 40 to identify the person (Taro) who spoke the spoken intent; and the control section 50 to judge whether or not the response message is information favorable to the identified person (Taro) and to cause the response message to be output from the input/output section 30 in cases in which the response message is judged to be favorable. Adopting such a configuration enables, in the example described above, information Taro does not want to be divulged to other passengers to be prevented from being reproduced from the output section 30.

(2) The control section 50 acquires plural response messages to respond to the spoken intent. The control section 50 selects from out of such plural response messages, plural response messages related to the person (Taro) identified by the recognition section 40. Within the selected response messages, the control section 50 then selects a response message favorable to the person (Taro) identified by the recognition section 40 from out of the plural response messages, and outputs the selected response message from the output section 30. Adopting such a configuration in which acquisition and selection of response messages is performed separately enables processing to be simplified in comparison to cases in which acquisition and selection of response messages is performed all at once.

(3) Whether or not a response message is favorable to the person (Taro) identified by the recognition section 40 is determined by the control section 50 judging whether or not the response message is suitable to be divulged to all persons recognized by the recognition section 40. Whether or not the response message should not be divulged to other passengers is judged for all passengers other than Taro, enabling appropriate output restrictions to be executed for unfavorable information.

(4) The control section 50 judges a response message containing a name of a person not recognized by the recognition section 40 to be unfavorable, enabling appropriate output restrictions to be executed for response messages unfavorable to any of all passengers including Taro.

(5) The control section 50 judges a response message containing words and actions of a person not recognized by the recognition section 40 to be unfavorable, enabling appropriate output restrictions to be executed for response messages unfavorable to any of all passengers including Taro.

The following modifications also fall within the scope of the present invention, and one or plural modified examples may be combined with the foregoing exemplary embodiment.

Modified Example 1

Explanation has been given regarding an example of the interactive device as one function of a navigation device installed in a vehicle. However, the present invention is not limited to such an example, and is also applicable to interactive devices employed as stand-alone products in the home or the like (including smartphones, products referred to as AI speakers or smart speakers, namely speakers provided with AI assistant functionality, and also emotionally-cognizant humanoid robots, and the like).

Explanation follows regarding examples of an interactive device envisaged for use in the home.

Assume a family includes four family members, these being a father, a mother, an elder son, and a younger son.

A problematic situation is one in which the mother and the children have a secret they do not wish to divulge to the father, and so information relating to the secret is not output from the interactive device in cases in which all family members are present around the interactive device. In such cases, the mother may set information identifying the secret in the information selection section 70 of the interactive device, such that secret information is not output when the father is also using the interactive device. For example, in cases in which the father has asked the interactive device about the mother's weight, the interactive device may refuse to answer such as by saying "I can't answer that question". On the other hand, in cases in which the fact that the mother is on a diet is common knowledge within the family (in cases in which the interactive device has been monitoring the contents of day-to-day conversation of the family and the interactive device has picked up on this fact), the interactive device might actually reply with the mother's weight (or with a slightly lower value than her true weight if necessary). Moreover, the interactive device may choose whether or not to reply with the mother's weight according to the degree of intimacy between the father and the mother (how well the father and the mother get on). Parameters for measuring the degree of intimacy may include, for example, considering the amount of husband-and-wife conversation (including the frequency of laughter and smiles) in daily life as monitored by the interactive device. Other parameters for measuring the degree of intimacy may include, in the case of a family, the number of email exchanges (including the number of phone calls), how often the family eats out, and how often they address each other by name. In the case of non-family members, parameters taken into account may include whether or not they know the makeup of each other's family, whether or not they know each other's interests, whether or not they exchange greeting cards on an annual basis, and so on. Whether or not the family makeup is known and whether or not interests are known may be judged based on information recorded by a wearable daily log camera (or recorder), and whether or not greeting cards are exchanged may ascertained by referring to a greeting card database.

Modified Example 2

Explanation follows regarding an interactive device envisaged for use in a department of a corporation. Assume staff in this department include Kobayashi (section leader of Section 1), Suzuki and Yamada (section members of Section 1), Yamamoto (section leader of Section 2), and Saito (section member of Section 2).

A problematic situation is one in which Section 1 and Section 2 are competing within the company against each other on the basis of sales. In cases in which the section leaders and section members belonging to both Section 1 and Section 2 are present during use of the interactive device, information relating to secrets that the sections do not want to divulge to each other is not output from the interactive device. In such cases, the members of Section 1 and Section 2 set information identifying secrets in the information selection section 70 of the interactive device, such that secret information is not output when members belonging to both Section 1 and Section 2 are both present during use of the interactive device.

Note that the information identifying secrets may be set by the interactive device itself, such as by machine learning or the like.

Modified Example 3

A configuration may be adopted in which information relating to people other than people around the interactive device, for example the names, and words and actions of people not around the interactive device, are treated as unfavorable information and are not output from the interactive device.

The interactive devices described above are configured so as not to output information adversely effecting some or all of plural people recognized by the interactive device, namely unfavorable information. These interactive devices envisage various usage situations, such as situations in which usage is exclusively by a family, situations in which usage is with friends, situations in which usage is exclusively by members of a single department of a corporation, situations in which usage is by a mix of members from different departments in a corporation, and situations in which usage is by members from plural corporations having mutual interests. In all of these usage scenarios the artificial intelligence recognizes information that might be unfavorable to any of the people around the interactive device at the same time of usage, and prevents such information from being output.

The artificial intelligence accordingly employs machine learning, deep learning, or the like to perform learning in the following contexts. Namely, the interactive device learns information that might negatively affect personal relationships, information that might have a negative effect on moods, information relating to competition or rivalry, and information with a high degree of confidentiality, in relation to people such as family members, staff of the same department or different departments of a single corporation, staff of plural corporations having mutual interests, and people in a friendship relationship as recognized by the interactive device. Information that would be unfavorable to people around the interactive device is prevented from being output based on the learnt content. In other words, only favorable information is output.

Although explanation has been given regarding various exemplary embodiments and modified examples, the present invention is not limited to the content thereof. Other conceivable implementations also falling within the scope of the technical concept of the present invention are also included in the scope of the present invention.

For example, in cases in which even though the interactive device is able to recognize the speaker (questioner), the interactive device is however unable to recognize other people (i.e. is able to recognize that there are people present but not to the extent of being able to verify their identities), before responding the interactive device may seek the speaker's prior consent, such as by saying, for example with "Taro, there's someone I don't know with you. Is it OK for me to answer?".

In cases in which the interactive device is a smartphone and the speaker is wearing earphones, there may be no need to restrict the selections when answering even though there is someone other than the speaker also present, since any response from the interactive device would be unable to be overheard by someone other than the speaker. Likewise, "automatic volume control/super directional speakers" in car navigation devices also mean that no one other than the speaker (driver) is able to overhear the speech, and so restricting the selections of answers may not be necessary. However, in such cases, since fellow travelers would be able to overhear the contents of the speaker's question, a response that can only be heard by the speaker and not heard by the fellow travelers is unnatural. Preferably the response to the speaker is given, and also another separate response not objectionable to the fellow travelers is given. The response directed at the fellow travelers may be given at the same time as the response to the speaker, or may be shifted to slightly before or after this response.

On the other hand, in cases in which a response is given by text instead of speech, there is a possibility that an accompanying person might be able to read the response even when the speaker is, for example, wearing earphones. Forbidding text-based responses (or restricting the response selections) is accordingly preferable. Note that a configuration permitting text-based responses (even without restrictions to the response selections) may be adopted in cases in which fellow travelers are not able to read text-based responses due to characteristics of the car navigation device or smartphone screen (for example if the car navigation device has a dual monitor or the smartphone has a privacy screen filter). In rare cases the interactive device might conceivably respond using sign language, and in such cases sign language-based responses (even without restrictions to the response selections) might be permitted.

Moreover, a configuration may be adopted in which the default state of the interactive device is normally set to a state in which there are no restrictions provided to responses, and response restriction (a stealth mode) is then started by image recognition of a gesture by the speaker (for example a "shhhsh" gesture of placing the index finger against the lips). Such a stealth mode may be set so as to be maintained from recognition of the gesture by the speaker until use of the interactive device ends. Obviously the stealth mode may also be turned ON or OFF by operating a button.

In the exemplary embodiments and modified examples described above, the interactive device is directed toward recognizing speech spoken by people. However, there is no limitation to people, and the interactive device may be configured to recognize speech from a robot that performs tasks autonomously (emotionally-cognizant humanoid robots or the like) and from avatars (virtual characters standing in for users). Although the user themselves is not physically present in the same space when such robots or avatars are employed, the user is able to control the behavior of such robots or avatars remotely through a display while being able to performing speech-based conversation (which may be in the user's own voice or may not be). Namely, say there is a person A present inside a vehicle, then another person B would be able to utilize a smart speaker (or wearable glasses device or VR goggles) at home (or elsewhere) to participate in a conversation inside the vehicle with person A through an avatar standing in for person B, as if person B were actually to be present In the present exemplary embodiments, explanations have been given regarding a navigation device employed inside a vehicle and regarding an embodiment in which a standalone smart speaker is employed in the home or the like. However, application may also be made to cases in which such a navigation device and home-use smart speaker are connected together (employing an information service such as telematics), and application may also be made to cases in which a navigation device, a home-use smart speaker, and a glasses-type wearable device (including VR goggles) are all three connected together.

EXPLANATION OF THE REFERENCE NUMERALS

10 input/output device
20 input section
30 output section
40 recognition section
50 control section
60 communication section
70 information selection section
100 network
110 artificial intelligence
120 database
200 navigation device

The invention claimed is:

1. A navigation device configured to perform destination suggestion, the navigation device comprising:
    a recognition section configured to perform recognition of a plurality of passengers;
    an input section configured to receive speech spoken by a passenger of the plurality of passengers recognized by the recognition section; and
    a control section comprising a processor programmed to control the destination suggestion based on the passenger recognized by the recognition section and a spoken intent of the passenger extracted from the received speech spoken by the passenger,
    wherein the processor is programmed to perform the destination suggestion based on relationship information indicating relationships between the plurality of passengers recognized by the recognition section, and
    wherein the processor is programmed to perform the destination suggestion based on the relationship information by:
    creating a plurality of destination candidates associated with information related to the recognized passenger;
    and selecting the destination suggestion from the plurality of destination candidates by excluding from the plurality of created destination candidates a destination candidate including information that would negatively affect a personal relationship between the recognized passenger and another passenger of the plurality of recognized passengers.

2. The navigation device of claim 1, wherein the recognition by the recognition section is performed by image recognition.

3. The navigation device of claim 1, wherein the processor is programmed to change the destination suggestion based on a number of the plurality of recognized passengers.

4. The navigation device of claim 1, wherein the processor is programmed to perform the destination suggestion based on behavioral information indicating various types of behavior history of the passenger.

5. The navigation device of claim 1, further comprising a speech output section configured to output the destination suggestion.

6. The navigation device of claim 1, wherein:
the recognition section is configured to recognize a gesture of the passenger; and
the processor is programmed to control the destination suggestion based on the gesture.

7. A vehicle installed with the navigation device of claim 1.

8. A navigation method for performing a destination suggestion, the navigation method comprising:
recognizing a plurality of passengers;
receiving speech spoken by a passenger of the plurality of recognized passengers; and
controlling the destination suggestion based on the recognized passenger and a spoken intent of the passenger extracted from the received speech spoken by the recognized passenger,
wherein the destination suggestion is performed based on relationship information indicating relationships between the plurality of recognized passengers, and
wherein the destination suggestion is performed based on the relationship information by:
creating a plurality of destination candidates associated with information related to the recognized passenger; and
selecting the destination suggestion from the plurality of destination candidates by excluding from the plurality of created destination candidates a destination candidate including information that would negatively affect a personal relationship between the recognized passenger and another passenger of the plurality of recognized passengers.

9. A non-transitory storage medium storing a program that is executable by a computer to perform the navigation method according to claim 8.

10. A navigation device configured to perform destination suggestion, the navigation device comprising a processor programmed to:
recognize a plurality of passengers;
receive speech spoken by a passenger of the plurality of recognized passengers; and
control the destination suggestion based on the recognized passenger and a spoken intent of the passenger extracted from the received speech spoken by the recognized passenger,
wherein the processor is programmed to perform the destination suggestion based on relationship information indicating relationships between a plurality of the recognized passengers, and
wherein the processor is programmed to perform the destination suggestion based on the relationship information by:
creating a plurality of destination candidates associated with information related to the recognized passenger; and
selecting the destination suggestion from the plurality of destination candidates by excluding from the plurality of created destination candidates a destination candidate including information that would negatively affect a personal relationship between the recognized passenger and another passenger of the plurality of recognized passengers.

* * * * *